United States Patent
Henry et al.

[11] 3,759,158
[45] Sept. 18, 1973

[54] DUCT AND BLOWER ARRANGEMENT

[75] Inventors: James Henry, Levittown; Malcolm MacMaster, Yardley, both of Pa.

[73] Assignee: Emhart Corporation, Bloomfield, Conn.

[22] Filed: May 1, 1972

[21] Appl. No.: 248,826

[52] U.S. Cl. .................. 98/33, 415/201, 417/360, 98/39, 98/43, 98/116
[51] Int. Cl. ............................................. F24f 13/00
[58] Field of Search .................. 417/360; 415/201; 98/39, 43, 33 R, 33 A, 116

[56] References Cited
UNITED STATES PATENTS

| | | | |
|---|---|---|---|
| 778,699 | 12/1904 | Nelson | 415/201 |
| 1,467,901 | 9/1923 | Lange | 98/116 |
| 1,548,247 | 8/1925 | Bennett | 415/201 |
| 1,687,843 | 10/1928 | Miller | 98/33 R |
| 2,100,152 | 11/1937 | Youker | 98/33 R |
| 2,580,797 | 1/1952 | Koch | 98/116 |
| 2,665,625 | 1/1954 | Woodhams | 98/116 |
| 2,682,826 | 7/1954 | Wahlborg | 98/116 |
| 2,837,021 | 6/1958 | McLarty | 98/116 |

FOREIGN PATENTS OR APPLICATIONS 247,718 2/1926 Great Britain ...................... 415/201

*Primary Examiner*—William J. Wye
*Attorney*—Albert Sperry et al.

[57] ABSTRACT

A Duct and Blower Arrangement is herein described which duct may be formed to define an opening in a side wall portion thereof to receive the blower. A flange may be formed in the duct for operatively supporting the blower within the duct, upon inserting the blower therein. A closure member may be connected with the blower for covering the opening in response to the proper insertion of the blower into the duct.

10 Claims, 6 Drawing Figures

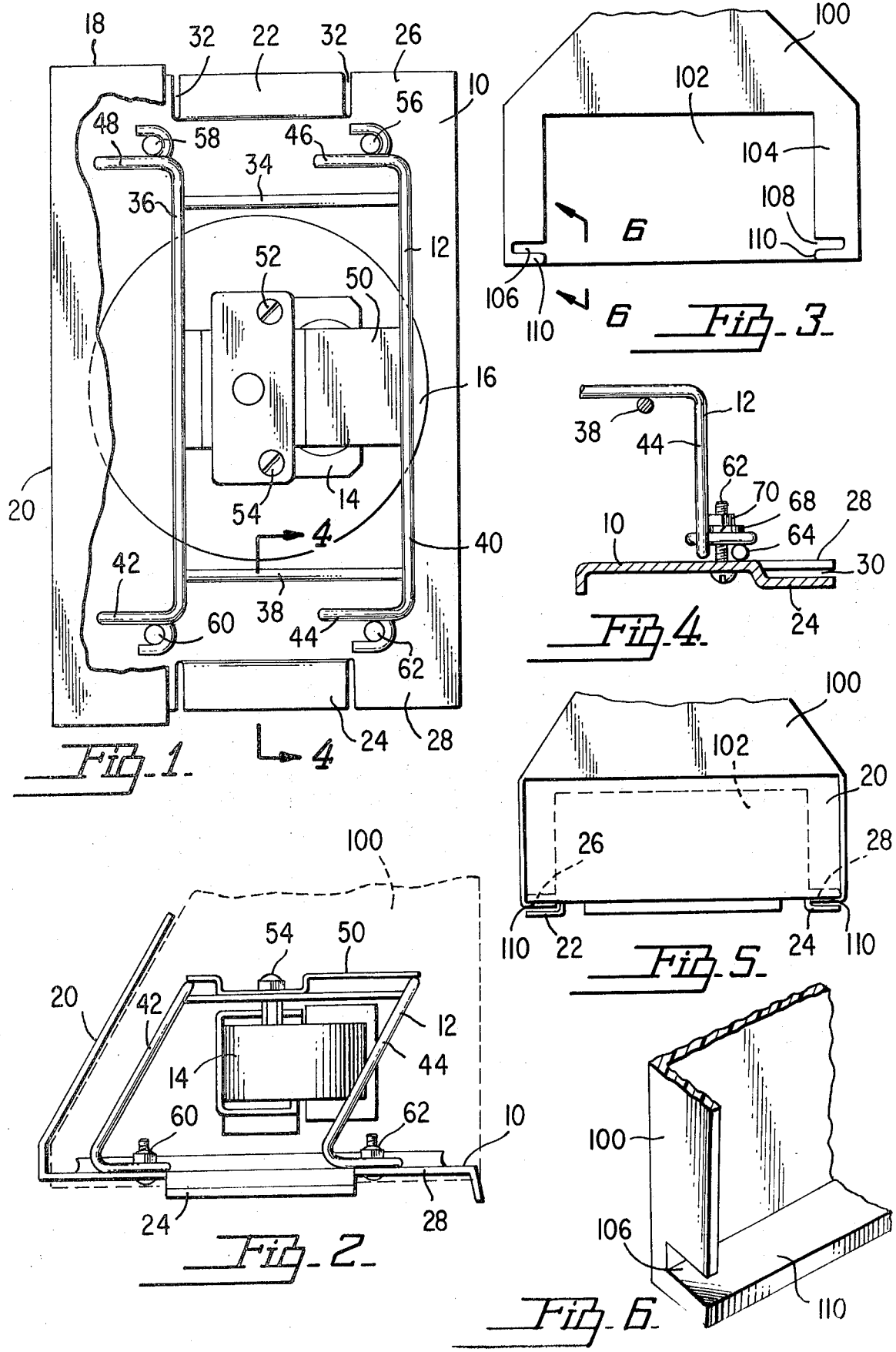

3,759,158

DUCT AND BLOWER ARRANGEMENT

BACKGROUND OF THE INVENTION

The present invention relates to air-handling equipment, and more specifically, relates to a duct and blower arrangement which facilitates the maintenance of the blower and tends to reduce the vibrations developed thereby, during the operation thereof.

Various blower mounts and duct installation arrangements have been suggested in the past for facilitating the maintenance of air handling apparatus and for dampening the vibrations generated by included rotary equipment.

More specifically, when a ducting arrangement is presented, having a generally vertically extending duct and an outlet opening spaced from, but disposed immediately adjacent, the floor; a problem is raised as to how a blower unit may be mounted within the inlet opening so as to facilitate access to that blower for installation and maintenance purposes.

Therefore, it would be advantageous if an improved blower and ducting arrangement were provided which blower is easily accessible for maintenance purposes and which arrangement would help reduce vibrations generated by the rotating blower.

OBJECTS AND SUMMARY OF THE INVENTION

Accordingly, it is an object of the present invention to provide an improved blower and duct arrangement.

It is another object of the present invention to provide a blower and duct arrangement which promotes easy access to the blower unit, so as to facilitate maintenance.

It is yet another object of the present invention to provide a blower and duct arrangement which is uniquely uncomplicated.

It is still another object of the present invention to provide an improved blower and duct arrangement which may be easily installed.

It is a further object of the present invention to provide a blower and duct arrangement wherein, the blower may be installed without having to use fastening means other than uniquely formed portions of the blower and duct.

It is still a further object of the present invention to provide a blower and duct arrangement which facilitates the dampening of vibrations generated by the blower.

It is still a further object of the present invention to provide an improved blower and ducting arrangement which is relatively inexpensive to manufacure.

It is still yet a further object of the present invention to provide a blower and ducting arrangement wherein the blower may be operationally mounted within the ducting by merely inserting the blower transversely through a hole formed in a side wall of the ducting which hole is automatically covered in response to the proper insertion of the blower.

It is a major object of the present invention to provide an improved blower and duct arrangement which solves many of the problems currently confronting the air handling equipment industry.

At least some of the above cited objects are achieved by the provision of a duct and blower arrangement including a duct which is formed to define an opening in a side wall portion thereof to receive the blower. A mounting portion may be formed in the duct for operatively supporting the blower therein, upon the insertion of the blower through the opening. A cloure element may be connected with the blower unit for covering the opening in response to the proper insertion of the blower, into the duct.

BRIEF DESCRIPTION OF THE DRAWINGS

While the invention is particlarly pointed out and distinctly claimed in a concluding portion of the specification, a preferred embodiment is set forth in the following detailed description which may be best understood when read in connection with the accompanying drawings in which:

FIG. 1 is a top plan view of a blower unit according to present invention;

FIG. 2 is a side elevation view of the blower unit shown in FIG. 1;

FIG. 3 is a front elevation view of a duct, formed to receive the blower set forth in FIGS. 1 and 2;

FIG. 4 is a vertical sectional view taken along line 4—4 of FIG. 1;

FIG. 5 is a front elevation view of the blower unit of FIG. 1, properly installed within the duct shown in FIG. 3; and FIG. 6 is a vertical sectional view of the duct, shown in FIG. 3, taken along line 6—6.

DETAILED DESCRIPTION OF THE PREFERRED EMBODIMENT

Referring to the drawings in which like numerals are used to indicate like parts throughout the various views thereof, FIG. 1 shows a top plan view of a blower unit, according to the present invention.

Referring now to FIG. 1, the blower unit according to the present invention, is shown to include a generally planar base 10, and a wire rack arrangement 12 for supporting an electric blower unit 14 over the upstream side of the generally planar base member 10.

The base member 10 may be formed with a generally centrally located, circular aperture, or orifice, 16 and a closure member 20 may be formed to extend upwardly from a marginal edge thereof. The closure member 20 will be discussed in more detail with respect to FIGS. 3, 5 and 6.

The generally planar base member 10 may be formed to present tab portions 22 and 24, formed in the side edge portions 26 and 28 of the overall base 10.

It will be noted, by reference to FIG. 4, that the portions 24 and 28 of the base 10 are so disposed as to be spaced in mutual parallel relationship so as to form a space 30. Tab 22 and portion 26 of the base 10 are similarly formed in spaced, mutually parallel relationship to form another space 32, corresponding with space 30. The significance of spaces 30 and 32 will be discussed in more detail with respect to FIGS. 3, 5 and 6.

Referring back to FIGS. 1 and 2, it can be seen that the wire rack 12, used for mounting the electric blower unit 14, generally comprises a first set of elements, extending mutually parallel with the base 10; and further comprises a second set of components extending obliquely to the base 10. As shown in FIGS. 1 and 2, elements 34, 36, 38 and 40 comprise the first set of components, extending mutually parallel with the generally planar base 10. Whereas, the second set of components consists of elements 42, 44, 46, and 48, extending obliquely to the plane of the base 10.

It has been found that the oblique components 42 through 48 provide a spring section which tends to dampen axial vibrations generated by the blower unit 14. Additionally, the axial component of each of the elements 42 through 48, tends to dampen the radial vibrations of the blower unit. Accordingly, greater damping is achieved than would be possible with elements 42 through 48 which were merely perpendicular to the base 10 to extend generally parallel with the axis of the blower unit 14.

A mounting belt 50 may be supported across horizontally extending wire rack elements 36 and 40 for mounting the electric blower unit 14 by means of screws 52 and 54. The overall wire rack 12 may be secured to the generally planar base 10 by means of threaded fastening members 56, 58, 60, and 62.

One mounting scheme, which has been found to be especially effective, is shown in FIG. 4. A looped terminal end 64 of the component 44, of the wire rack 12, may be placed over the threaded fastening element 62. An elastomeric washer 66 may be placed immediately over the looped terminal end 64 of the element 44 and a rigid metallic washer 68, may be disposed between the elastomeric washer 66 and a nut 70 of the overall threaded fastening element 62. This mounting scheme may be utilized at each of the mounting points 56 through 62.

Referring now to FIG. 3, a lower inlet portion of a duct 100 is shown, in front elevational view.

The duct is formed to define an opening 102 in the side wall portion 104 thereof. The opening 102 may be formed with mounting portions 106 and 108 for slidingly receiving the portions 26 and 28 of the blower mount base 10. Additionally, the thickness of lower portion 110, defining openings 106 and 108, may be of such a magnitude as to fit snugly within space 30 (see FIG. 4), defined by the portion 28 and the tab portion 24.

Referring to FIG. 6, a vertical sectional view of the portion of the duct shown in FIG. 3, is shown along line 6—6 thereof.

It can be seen, that the portion 110 portion 28 the ducting presents somewhat of a supporting shelf for engaging the underside of the portion 28 of the mounting base 10, so that the mounting base may be slidingly inserted into the overall opening 102, while being supported on the portions 110 vibrational the ducting. Furthermore, it can be seen that, since the portion 28 and the tab 24 may engage both sides of the shelf-like portinon 110, of the ducting 100, when the ducting comprises a high density polyethylene plastic, or the like, additional damping is effected by the portions 28 and the tabs 24, dissipating vibrationsl energy in cooperation with the relatively flexible shelf portion 110, of the ducting 100.

Referring now to FIG. 5, the overall assembly of the present invention is shown in an operational posture.

It can be seen that the tabs 22 and 24 are presented on the underside of the shelf-like portion 110 of the ducting 100; while the base portions 26 and 28 are disposed on an upper surface of the shelf-like portions 110.

additionally, it will be noted that the closure portion 20 of the base 10, is operable to cover the opening 102 formed in the ducting 100, for receiving the overall blower and mount assembly.

Accordingly, the assembly, according to the present invention, has the unique feature of automatically closing the opening provided for the operational installation thereof. It should be understood, of course, that although the ducting and closure portion 20 of the preferred embodiment presents a generally oblique configuration, the closure member 20 may be angled to close an opening of virtually any incline.

Additionally, although the preferred embodiment contemplates the positioning of a blower in the lower portion of a vertical duct and, in particular, in a lower portion which is sufficiently close to a floor as to preclude access thereto from beneath the blower; the invention embodied in the preferred embodiment may be applied at any point along the length of a conduit, without departing from the present invention.

SCOPE OF THE INVENTION

Therefore, while what has been shown herein is the preferred embodiment of the present invention, it is, of course, understood that various modifications and changes may be made therein without departing from the invention. Hence, it is intended to cover in the following claims all such modifications and changes as may fall within the true spirit and scope of the present invention.

What I claim is:

1. A duct and blower arrangement comprising:
   a duct having an opening in one end thereof through which air may be moved;
   said duct having a lateral opening therein for receiving a blower unit;
   a blower unit movable into and out of said duct through said lateral opening;
   means on said duct for suporting said unit upon insertion thereof into said duct through said lateral opening;
   said blower unit having a base which extends transversely across the duct when the unit is inserted into said lateral opening and has an air passage therethrough communicating with said one end of the duct;
   a blower mounted on said base for moving air longitudinally through said duct past said lateral opening; and
   a closure member carried by said unit and located at one side of said base in position to close said lateral opening upon insertion of said unit into said duct through said lateral opening.

2. A duct and blower arrangement according to claim No. 1, wherein said blower is mounted on said generally planar base member by a wire rack having a first set of components extending generally mutually parallel with respect to said base member; and
   said wire rack having a second set of components extending generally obliquely to said base member.

3. A duct and blower arrangement according to claim No. 2, wherein the components of said second set of components are arranged to extend mutually parallel.

4. A duct and blower arrangement according to claim No. 1, wherein said base member is on a downstream side of said blower and is formed with a generally centrally disposed orifice.

5. A duct and blower arrangement according to claim No. 1, wherein said base member is formed with portions which extend over both sides of said means for supporting said blower.

6. A duct and blower arrangement according to claim No. 4, wherein said duct is disposed to extend generally vertically and said base member is operable to extend transversely of said duct, over a lower inlet opening thereof.

7. A duct and blower arrangement according to claim No. 5, wherein at least said means for supporting said blower comprises a high density thermoplastic material.

8. A blower arrangement according to claim No. 1, wherein tab means is formed on said base;
   A. said tab means being spaced from and extending mutually parallel with said base member adjacent an edge portion thereof;
   B. whereby portions of said base and said tab means are operable to extend over opposite sides of a flange means formed adjacent the side wall opening in the duct, for mounting said blower and for dampening vibrations developed thereby.

9. A blower arrangement according to claim No. 1, wherein said blower is mounted on said base means by a wire rack arrangement;
   A. said wire rack having a first set of components extending generally parallel with said base; and
   B. said wrie rack having a second set of components extending generally obliquely with respect to said base.

10. A blower arrangement according to claim No. 1, wherein said base is positioned downstream from said blower and is formed with a generally circular orifice.

* * * * *